(No Model.) 5 Sheets—Sheet 1.

H. W. ALBRIGHT & S. B. LENHERT.
GATE FOR RAILWAY CROSSINGS.

No. 502,341. Patented Aug. 1, 1893.

WITNESSES:
Geo. A. Lane
Ella L. Gerhart

INVENTORS
Harry W. Albright
Samuel B. Lenhert
BY
Wm. R. Gerhart
ATTORNEY.

(No Model.) 5 Sheets—Sheet 2.

H. W. ALBRIGHT & S. B. LENHERT.
GATE FOR RAILWAY CROSSINGS.

No. 502,341. Patented Aug. 1, 1893.

WITNESSES:
Geo. A. Lane
Ella L. Gerhart

INVENTORS
Harry W. Albright
Samuel B. Lenhert
BY
Wm. R. Gerhart
ATTORNEY.

(No Model.) 5 Sheets—Sheet 3.

H. W. ALBRIGHT & S. B. LENHERT.
GATE FOR RAILWAY CROSSINGS.

No. 502,341. Patented Aug. 1, 1893.

WITNESSES:
Geo. A. Lauw
Ella L. Gerhart

INVENTORS
Harry W. Albright
Samuel B. Lenhert
BY Wm. R. Gerhart
ATTORNEY.

(No Model.)    5 Sheets—Sheet 4.

H. W. ALBRIGHT & S. B. LENHERT.
GATE FOR RAILWAY CROSSINGS.

No. 502,341.    Patented Aug. 1, 1893.

WITNESSES:
Geo. A. Lane
Ella L. Gerhart

INVENTORS
Harry W. Albright
Samuel B. Lenhert
BY
Wm. R. Gerhart
ATTORNEY.

(No Model.) 5 Sheets—Sheet 5.

H. W. ALBRIGHT & S. B. LENHERT.
GATE FOR RAILWAY CROSSINGS.

No. 502,341. Patented Aug. 1, 1893.

Witnesses
D. M. Rothenberger.
Geo. A. Lane

Inventors
Harry W. Albright
Samuel B. Lenhert.
By Attorney
Wm. R. Gerhart

UNITED STATES PATENT OFFICE.

HARRY W. ALBRIGHT AND SAMUEL B. LENHERT, OF MAYTOWN, PENNSYLVANIA.

GATE FOR RAILWAY-CROSSINGS.

SPECIFICATION forming part of Letters Patent No. 502,341, dated August 1, 1893.

Application filed September 5, 1892. Serial No. 445,034. (No model.)

*To all whom it may concern:*

Be it known that we, HARRY W. ALBRIGHT and SAMUEL B. LENHERT, citizens of the United States, residing in Maytown, in the county of Lancaster and State of Pennsylvania, have invented certain Improvements in Gates for Railway-Crossings, of which the following is a specification.

This invention relates to improvements in that class of gates employed at the road crossings of railways; and the objects of our improvements are, first, to combine automatically acting gates for road crossings and the footways adjoining them; second, to actuate gates automatically by trains approaching the crossing on a single track from either direction through the same mechanism; third, to actuate gates automatically by trains approaching the crossing on a double track from either one or both directions through the same mechanism; fourth, to actuate gates automatically by means of a shifting weight acting on said gates; and, fifth, to reduce the strain on the actuating parts to a minimum by means of counter weights acting on the gates and on the mechanism through which they are operated. We accomplish these results by the mechanism illustrated in the accompanying drawings, in which—

Fig. 14 is an edge view thereof from the direction of arrow 3, same figure.

In both of the last figures there is illustrated a modified form of frame L and the parts are shown in the positions occupied by them when the shifting weight is located in the vibrating end of frame L and holds the gates closed down.

Similar letters and figures indicate like parts throughout the several views.

Referring to the details of the drawings, A indicates the rails; B, the cross ties on one side of the crossing, and B' those on the other.

Figure 1:
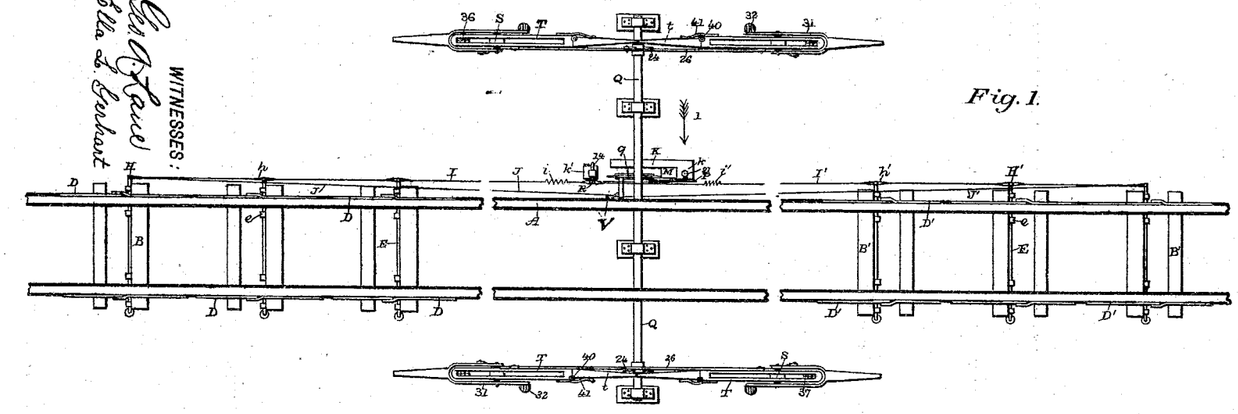
Figure 1 is a top or plan view of our device applied to a single track, the gates being shown in a closed position, and Fig. 2 a side elevation of the same taken from the direction of arrow 1, in Fig. 1.
Figure 2:
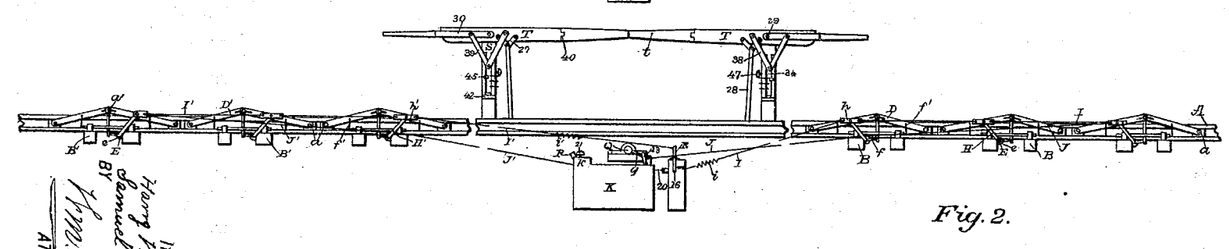
Figure 3:
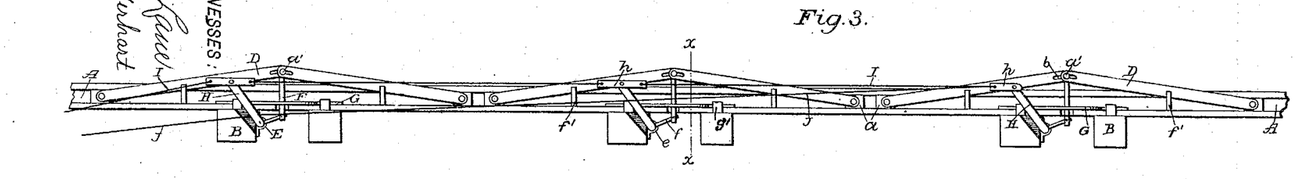
Fig. 3 is an enlarged side elevation of the treadles on one side of the crossing, looking toward that side of the track on which the treadles connected with the operating mechanism are placed, and Fig. 4 a similar view from the reverse side of the track.
Figure 4:
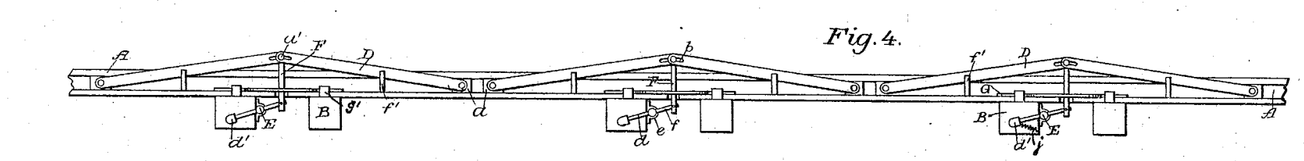
Figure 5:
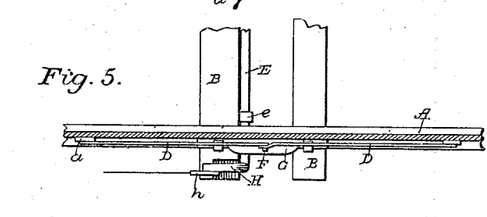
Fig. 5 is an enlarged top or plan view of a pair of outer end treadles, the head of the rail being cut away.
Figure 6:
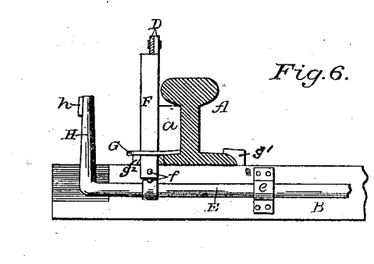
Fig. 6 is an enlarged transverse section on the line $x$—$x$, Fig. 3.
Figure 7:
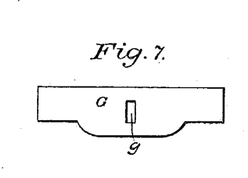
Fig. 7 is a plan view of one of the guide-plates of the treadle posts.

D D' represent treadles attached to the rails of the track on opposite sides of the crossing. These treadles are united in pairs and placed opposite each other on the outside of both lines of rails of the track. The outer end of each treadle of a pair is pivoted to the web of the rail through filling blocks $a$, of such thickness as to free the treadles from contact with the head of the rail. Slots $b$ are formed in the inner ends of the treadles, which lap each other and are connected by pins $a'$, said ends resting on posts F. These posts F are pivotally connected with arms $f$, projecting in the direction opposite that of the crossing from rock-shafts E, journaled in bearings $e$, bolted to the ties on the vertical faces thereof away from said crossing, as shown in Figs. 3, 4 and 6. Guide-plates G are secured to the base of the rails by the spikes, $g'$, holding said rails in place and are provided with slots $g$, through which, and recesses $g^2$ formed in the bases of the rails, the posts F pass, whereby said posts are braced against buckling under the pressure put upon them.

On one side of the crossing and on the outside of the rail there are upright arms H formed on the ends of rock-shafts E, and on the same ends of the rock-shafts on the other side of the crossing are formed similar arms H', said arms having pivoted to them, respectively, links $h$ and $h'$. On the side of the track opposite to that on which arms H H' are placed there are arms $d$ projecting from the rock-shafts toward the crossing, having weights $d'$ affixed to their outer ends. In addition to the weights the depression of the arms $d$ attached to the rock-shaft farthest from the crossing may be accelerated by springs $j$, having one end attached to said arms and the other to the ties. Normally the treadles slope upward from the ends at which they are pivoted, so that the united ends of each pair project above the heads of the rails in position to be engaged by the wheels of passing trains; the slope thus given them causing them to be depressed gradually, thus avoiding the shock which would otherwise be given the mechanism they actuate by abrupt contact of the wheels with said treadle. These treadles are held in position and prevented from bending transversely under the pressure to which they are subjected by guide pins $f'$, projecting upward from the base of the rails.

At the side of the track on which arms H H' are located, there is a frame or plate K sunk in a pit in the ground, from the upper part of one end of which a bracket $k$ projects inward toward the track. Against the inner face of this plate and below bracket $k$ there is an inclined frame L pivoted at $m$ through an offset plate M, formed with or rigidly secured to the longitudinal bars 5 of said frame, which bars are connected at the ends by transverse bars $l$. In an open rectangular space formed between bars 5 and the transverse bars $l$ there is a shifting weight N, having recesses $n$ in its upper and lower edges in which grooved rollers 7 are journaled between posts 6, which rollers engage the bars 5.

At 11 the lower end of weight N is pivotally connected by a rod 10 with the lower end of an intermediate lever P, fulcrumed to the inner face of the bracket $k$ at $p$, and on the other end of said weight there is secured an inwardly extending curved stop, 12. To the upper bar 5, near the vibrating end of frame L, there is fastened an inwardly extending spring-plate 8, from which depends an arm 9, adapted to be engaged by stop 12, as will be explained. The vibrating end of frame L has a rod 13 pivoted to it near its upper edge that connects it with a crank $q$, secured to a rock-shaft Q. This rock shaft extends lengthwise of the center of the road crossing the track and beneath the said track and above plate L, and actuates the gates which close the crossing on both sides of the railway, as will be hereinafter described.

At the end of plate K opposite that on which bracket $k$ is located there is a post $k'$, in a bearing 15, on the top of which is journaled a fulcrum rod 14, carrying on its inner end a double lever R, to the end of which below said fulcrum rod is pivoted a link $r$, having its inner end connected with a link 19, pivoted to lever P, by a cord or wire 20 and a coiled spring 23. The outer end of fulcrum rod 14 is bent down against the outer face of post $k'$, so as to form a vibrating arm 16, against the side of which opposite the shifting weight, there presses a spring 17. The links $h$ of arms H and the inner end of the link $h$ adjoining plate L and the outer end of link $r$ are connected by cords or wires I, the portion of the cord between link $r$ and the adjoining link $h$ being divided into sections connected by a spring $i$. Similarly links $h'$, of arms H', are connected with each other and with the end of lever R above fulcrum rod 14 by cords or wires I', the portion of the cord between lever R and the adjoining link $h'$ being also divided into sections connected by a spring, $i'$; the innermost of said cord-sections engaging an eye 18 in the upper end of said lever R. Opposite the vibrating end of frame L there is erected a post V, having a bent releasing lever fulcrumed thereto at 51. This lever is fulcrumed through the upright arm 49 above the other arm 50, which is bent in an approximately horizontal position toward the pivoted end of frame L and with the end thereof beneath and in position to engage the spring-plate 8. The arm 49 is connected above the fulcrum 51 with the outermost link $h$ by a rod or wire J, and below said fulcrum with the outermost link $h'$ by a rod or wire J'.

Figure 8:
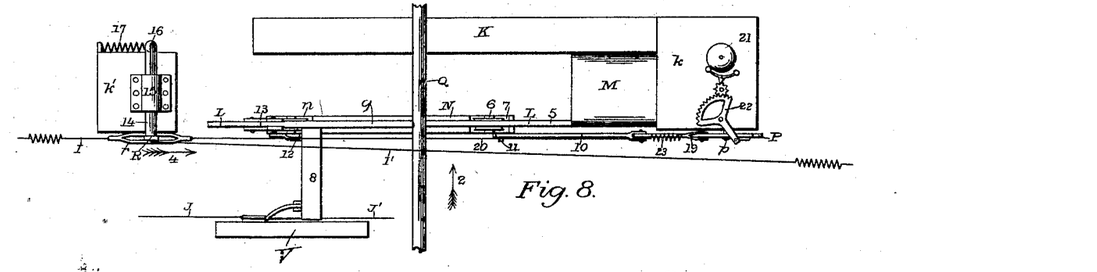
Fig. 8 is an enlarged top or plan view of the mechanism through which the shaft that opens and closes the gates is operated.
Figure 9:
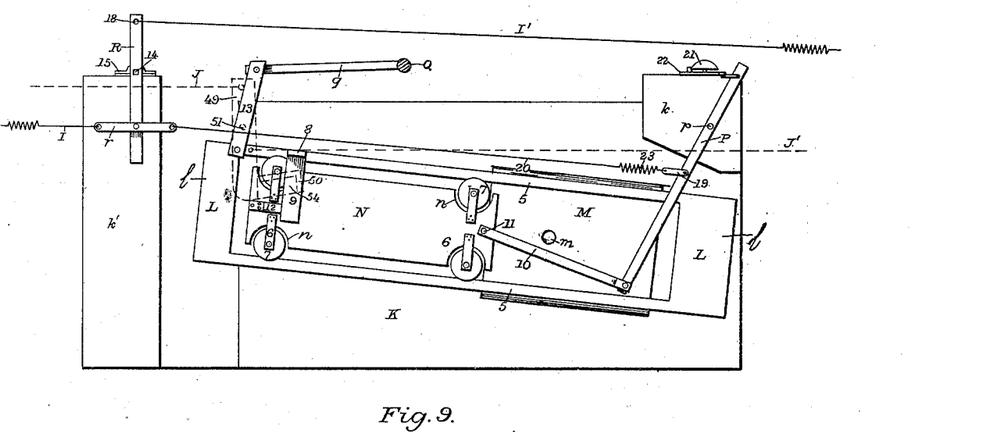
Fig. 9 is a side view of the same taken from the direction of arrow 2, Fig. 8, showing the mechanism in the position it occupies when the gates are closed, and Fig. 10 a similar view, but showing the position of the mechanism when the gates are open.
Figures 10, 12, 14:
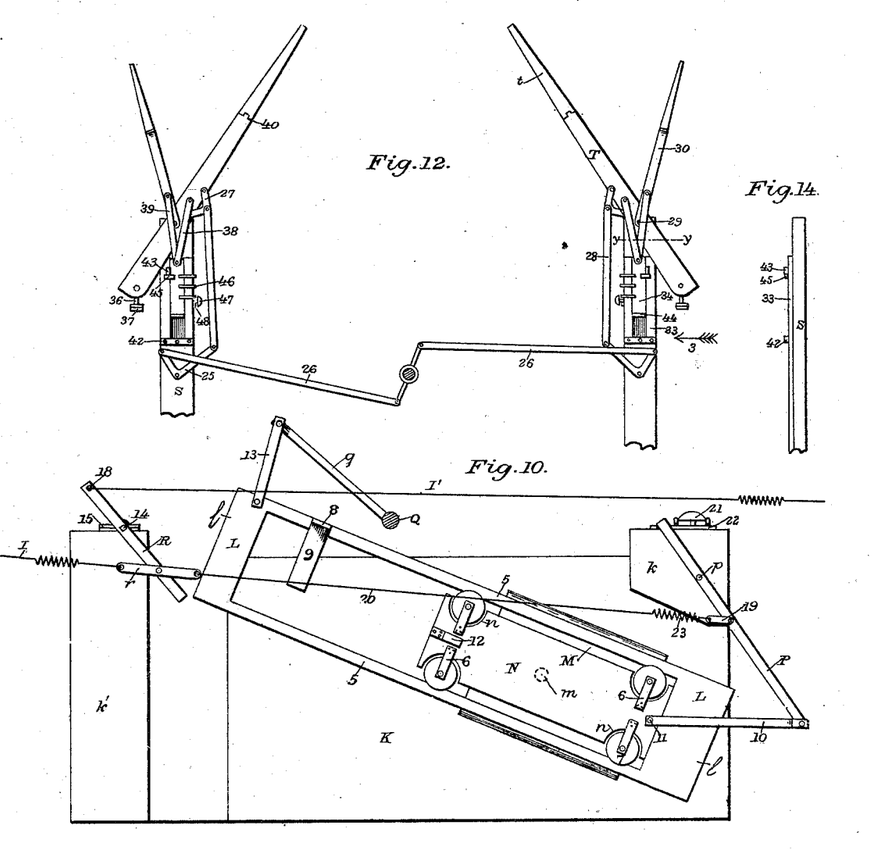

Normally the shifting weight rests in the pivoted end of frame L and has its center of gravity on the side of pivot $m$ toward lever P, thus elevating the vibrating end of frame L and holding the gates open through rock-shaft Q, as will be described. The engagement of the wheels of a train with the treadle D or D', or both, actuates lever R to draw the lower end of lever P toward it, forcing the center of weight N over pivot $m$ and lowering the vibrating end of frame L (which, however, is still somewhat elevated) and thereby closing the gates. The action of weight N in depressing the vibrating end of frame L begins as soon as its center passes over pivot $m$, and the intensity of that action increases as the weight advances, culminating as it reaches the limit of its movement toward the end of frame L. As the weight approaches said end of lever L the stop 12 raises spring-plate 8 by pushing out arm 9, which is instantly forced back behind said stop by spring-plate 8 as it is relieved from the pressure of stop 12 and holds the weight in the vibrating end of frame L. As will be observed, there are three pairs of treadles placed on each side of the crossing, those on each side being connected together and with lever R by cords or wires I or I'. This construction permits the slack in the connecting cords or wires to be taken up gradually and, with springs $i$ $i'$, causes the gradual application of a yielding force to lever R, the application of which force to lever P is still further eased by the spring 23, thus preventing any undue shock or jar to the operating parts. With the cessation of pressure on the treadles lever R resumes its normal or inclined position, as shown in Fig. 10, the return to that position being rendered positive by the pressure of spring 17 against vibrating arm 16. By this movement of lever R, tension on the lower end of lever P is relieved and weight N, by reason of the inclination of frame L rolls back to its normal position. A signal of the approach of a train is given by a gong bell 21, mounted on bracket $k$ and sounded by the movement of the upper end of lever P acting on a segmentally armed lever 22, as fully shown in Figs. 8 and 9.

During the passage of a train over the treadles weight N is held in the vibrating end of frame L by the engagement of arm 9 with stop 12. As the wheels of the last car leaving the crossing pass away over the outermost pair of treadles the depression thereof, acting through the cord or wire J or J', elevates arm 50 of releasing lever 49–50 until, by its engagement with spring-plate 8, it disengages arm 9 from stop 12. It must be understood that the depression of the outermost treadles is not sufficient to actuate the lower end of lever P to move weight N toward the vibrating end of frame L, nor to hold it there. It simply serves to take up the slack in the cords or wires; the depression of the second pair of treadles puts the tension on the springs in the lines of cords or wires and begins the movement of levers R and P, completed by the depression of the innermost pair of treadles; so that when the outermost treadles are depressed by the wheels of the last car of an outgoing train no movement of levers R and P takes place, but the releasing lever is raised to free weight N from the action of arm 9. After the removal of the pressure from the outermost treadles the releasing lever is returned to its normal or upright position, as shown by dotted lines in Fig. 9, by a weight 54, secured to the arm 50 of said lever.

When our device is applied to a double track, separate rock-shafts E and treadles similar to those described are connected with each of said tracks and the arms H H' connected with lever R and releasing lever 49–50 in the same manner as when the device is used with a single track road; but it is preferable that the frame or plate K be placed between the tracks. As will be seen, the treadles on both sides of the crossing impart movement in the same direction to lever R and also to the releasing lever, and that the treadles of any number of tracks similarly connected with said levers will produce the same result. There can, therefore, be no conflict in the action of any number of similar sets of treadles; nor can there be any kind of strain exerted upon said levers by any number of sets of treadles other than that exerted by one set. Each and all of any number of sets of treadles may be actuated by different trains at the same time and yet the effect upon the mechanism actuating the gates will be the same as though it was being acted on by only one set of treadles.

Figure 11:
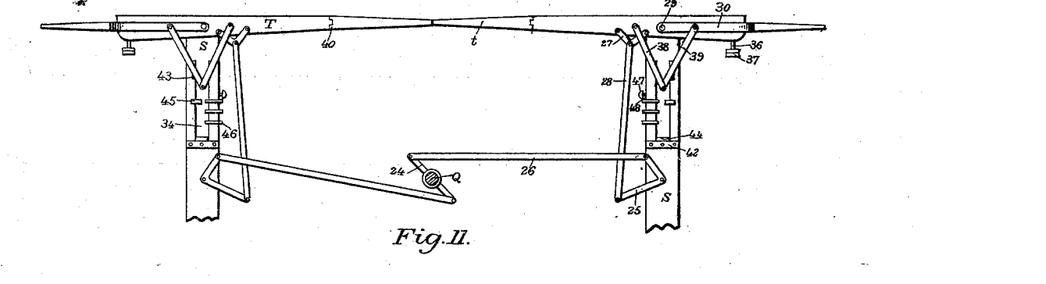
Fig. 11 is an inner face view of the gates, showing the connections of the same with the shaft operating them, the gates being closed, and Fig. 12 a similar view, but showing the positions of the same parts when the gates are open.
Figure 13:
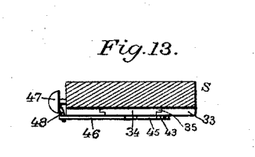
Fig. 13 is a section of one of the posts on line $y$—$y$, Fig. 12.
Figure 15:
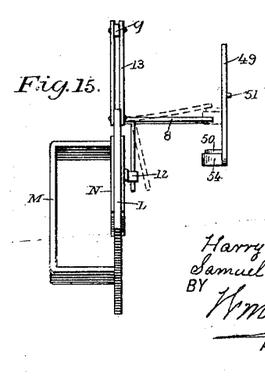
Fig. 15 is an end view of the device for operating the gate shaft, as seen from the direction of arrow 4, Fig. 8, showing the releasing device of the shifting weight frame.
Figure 16:
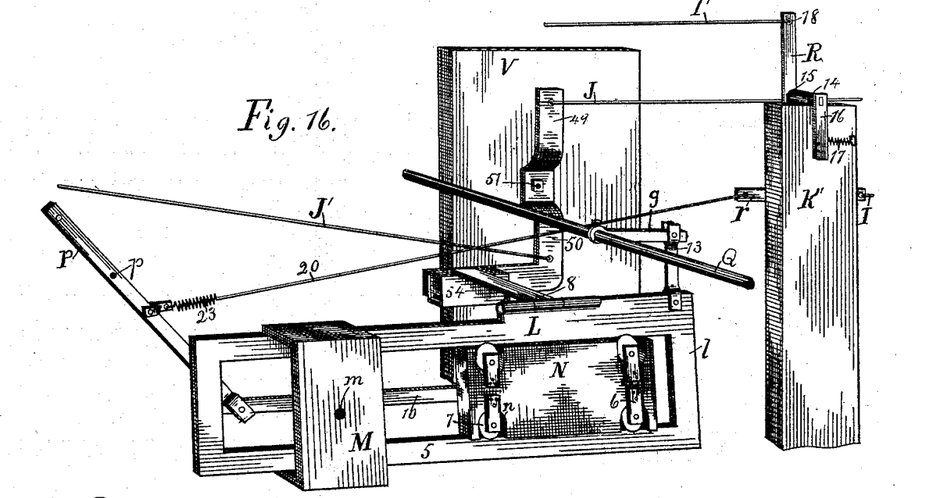
Fig. 16 is an enlarged outer perspective view of the shifting weight and releasing device, the frame or plate K being omitted, and Fig. 17 a similar inner perspective view, a portion of frame or plate K being cut away and the bell or gong on bracket $k$ and the post V omitted.
Figure 17:
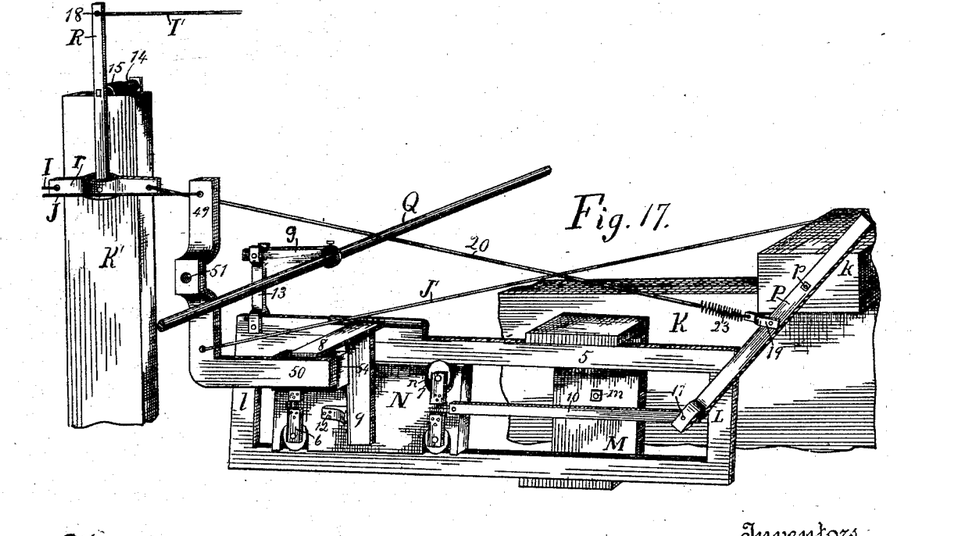

On each side of the roadway on both sides of the crossing there are erected gate posts S, the upper ends of which are engaged in slots in the main portion of the sectional gates T, pivoted thereto by bolts 29. The inner sections $t$ of the gates are united therewith by hinges 40, connecting the outer vertical edges of the sections, the adjacent ends of which form square butts to prevent the sections $t$ from swinging inward. The gates are thus formed in sections to permit a passage from the track through the lowered gates, the sections $t$ of which are held in their normal positions by springs 41, attached to the main sections of the gates. The gates increase in depth from the meeting ends of sections $t$, to the extremities of the sections pivoted to the posts S, which extremities extend outward beyond the posts, as shown in Figs. 11 and 12. In the slots in said extremities of the pivoted sections there are pivoted depending rods 36, carrying removable weights 37 to serve as counter balances to the weight of the closing ends of the gates and facilitate the raising of the same when the gates are to be opened. A triangular plate 27 is secured to each gate inside of the post and connected by a pivoted rod 28 with the innermost arm of a bell-crank lever 25, pivoted to the lower end of the post. The outer arms of the bell-crank levers of opposite posts are connected by rods 26 with opposite ends of arms 24, secured to rock-shaft Q. A gate 30, adapted to close the adjacent footway, is also hinged to each post and has its hinged end forked to embrace the extremity of gate T, said hinged end being engaged by bolts 29, so that both gates on the post have the same axis of motion. The outer jaw 31 of the hinged end of gate 30 extends inward beyond bolt 29 and carries a weight 32, adapted to counterbalance the weight of the outer end of said gate. There is a plate 33 secured to the face of each post above bell-crank lever 25, and in the plate there is formed a winged vertical slot, engaged by a sliding-post 34 having flanges 35, which engage the wings of the slot, as shown in Fig. 13. To the upper end of sliding post 34 there is pivoted one end of each of the connecting rods 38 and 39, the other end of rod 38 being pivoted to gate S at a suitable distance from bolt 29 and the other end of rod 39 to the gate 30. By this construction the movements of gate S are communicated to gate 30, so that both gates are raised and lowered simultaneously and by the same power. On the face of plate 33 and at the bottom of the groove therein there is secured a buffer 42 in position to be engaged by a buffer 44, formed on the lower end of sliding post 34 and adapted to engage buffer 42 before the lower end of said post strikes the bottom of the groove. There is also a buffer 43 formed on plate 33 near the upper end of the slot therein and located to be engaged by the buffer 45, projecting from the side of the sliding post and adapted to engage buffer 43 as said post completes its upper movement. In order to call attention to the movement of the gates there is a gong-bell 47 fixed to the inner face of each post S, the clapper of which is actuated by a tappet 48, adapted to be engaged by a series of arms 46 projecting from posts 34, as shown in Figs. 11 and 12. A view of the face of the post to which gong-bell 47 is attached is not shown, as any desirable mechanism for sounding said bell may be used and that indicated in the drawings is old and well known.

Throughout the mechanism herein described the gravity of the parts to be raised is neutralized by counter balancing weights, to as great an extent as can be consistently with the result to be attained, thus reducing the strain on the actuating mechanism to a minimum.

We do not confine ourselves to the details of construction herein shown and described, as it is obvious that many alterations may be made therein without departing from the spirit of our invention. Neither do we restrict ourselves to the mode herein described for applying our device for operating the gates to two or more tracks, as it is obvious that it might be done in a number of different ways.

Having thus described our invention, what we claim as new, and desire to secure by Letters Patent, is—

1. The combination, with the gates of a railway crossing, of a lever supporting a shifting weight, an intermediate lever connected with the shifting weight and adapted to move said weight to and from the vibrating end of the lever supporting it, an operating connection between the vibrating end of said weighted lever and said gates, treadles connected with the rails of the track, and a connection between the treadles and said intermediate lever, whereby the intermediate lever is actuated, substantially as specified.

2. The combination, with the gates of a railway crossing and a rock-shaft constructed to operate the same, of a lever frame, a shifting weight supported in said lever frame, an intermediate lever connected with the shifting weight and adapted to move said weight to and from the vibrating end of said lever frame over the pivot thereof, an operating connection between the vibrating end of the lever frame and said rock-shaft, treadles connected with the rails of the track, and a connection between the treadles and said intermediate lever, whereby the intermediate lever is actuated, substantially as specified.

3. The combination, with the gates of a railway crossing and a rock-shaft constructed to operate the same, of a lever supporting a shifting weight, an operating connection between the vibrating end of the weighted lever and said rock-shaft, an intermediate lever connected with the shifting weight and adapted to actuate the same, a double lever having one end connected with the intermediate lever, and treadles located at the sides of the rails of the track on opposite sides of the gates, the treadles on opposite sides of the gates being connected with opposite ends of the double lever, substantially as and for the purpose specified.

4. The combination, with the gates of a railway crossing, of a lever supporting a shifting weight, an operating connection between the vibrating end of said weighted lever and the gates, an intermediate lever connected with the shifting weight and adapted to actuate the same, a double lever united with the intermediate lever by a yielding connection, and treadles located at the sides of the rails of the track on opposite sides of the gates, the treadles on opposite sides of the gates being connected with opposite ends of the double lever, substantially as and for the purpose specified.

5. The combination, with the gates of a railway crossing, of a lever supporting a shifting weight, an operating connection between the vibrating end of said weighted lever and the gates, an intermediate lever connected with the shifting weight and adapted to actuate the same, a double lever secured to the end of a bent revoluble fulcrum rod, a spring bearing against the bent over portion of the fulcrum rod on the side thereof opposite the intermediate lever, a connection between one end of the double lever and the intermediate lever, and treadles located at the sides of the rails of the track on opposite sides of the gates, the treadles on opposite sides of the gates being connected with opposite ends of the double lever, substantially as and for the purpose specified.

6. The combination, with the gates of a railway crossing, of a lever supporting a shifting weight, an operating connection between the vibrating end of said weighted lever and the gates, an intermediate lever connected with the shifting weight and adapted to actuate the same, a double lever secured to the end of a bent revoluble fulcrum rod, a spring bearing against the bent over portion of the fulcrum rod on the side thereof opposite the intermediate lever, a yielding connection between one end of the double lever and the intermediate lever, and treadles located at the sides of the rails of the track on opposite sides of the gates, the treadles on opposite sides of the gates being connected with opposite ends of the double lever, substantially as and for the purpose specified.

7. The combination, with the gates of a railway crossing, of a lever supporting a shifting weight, an operating connection between the vibrating end of said weighted lever and the gates, an intermediate lever connected with the shifting weight and adapted to actuate the same, a double lever having one end connected with the intermediate lever, and a series of connected treadles located by the sides of the tracks on each side of the gates, the series of treadles on opposite sides of the gates being connected with opposite ends of the double lever, said treadles being adapted to communicate movement successively and progressively to said double lever, substantially as and for the purpose specified.

8. The combination, with the gates of a railway crossing, of a lever supporting a shifting weight, an operating connection between the vibrating end of said weighted lever and the gates, an intermediate lever connected with the shifting weight and adapted to actuate the same, a double lever having one end connected with the intermediate lever, and a series of connected treadles located by the sides of the tracks on each side of the gates, the series of treadles on opposite sides of the gates being connected with opposite ends of the double lever, said treadles being adapted to communicate movement successively and progressively to said double lever, the connections between said series of treadles and the levers actuating the shifting weight being constructed to yield to a limited extent under the strain exerted thereon, substantially as and for the purpose specified.

9. The combination, with the gates of a railway crossing, of a lever supporting a shifting weight, an operating connection between the vibrating end of said weighted lever and the gates, an intermediate lever connected with the shifting weight and adapted to actuate the same, a double lever secured to the end of a bent revoluble fulcrum rod, a spring bearing against the bent over portion of the fulcrum rod on the side thereof opposite the intermediate lever, a connection between one end of the double lever and the intermediate lever, and a series of connected treadles located by the side of the track on each side of the gates, the series of treadles on opposite sides of the gates being connected with opposite ends of the double lever, said treadles being adapted to communicate movement successively and progressively to said double lever, substantially as and for the purpose specified.

10. The combination, with the gates of a railway crossing, of a lever supporting a shifting weight, an operating connection between the vibrating end of said weighted lever and the gates, an intermediate lever connected with the shifting weight and adapted to actuate the same, a double lever secured to the end of a bent revoluble fulcrum rod, a spring bearing against the bent over portion of the fulcrum rod on the side thereof opposite the intermediate lever, a connection between one end of the double lever and the intermediate lever, and a series of connected treadles located by the track on each side of the gates, the series of treadles on opposite sides of the gates being connected with opposite ends of the double lever, said treadles being adapted to communicate movement successively and progressively to said double lever, the connections between said series of treadles and the levers actuating the shifting weight being constructed to yield to a limited extent under the strain exerted thereon, substantially as and for the purpose specified.

11. The combination, with the gates of a railway crossing, of a lever supporting a shifting weight, an operating connection between the vibrating end of said weighted lever and the gates, an intermediate lever connected with the shifting weight and adapted to actuate the same, a double lever having one end connected with the intermediate lever, a series of pairs of treadles located on each side of the gates, the treadles of each pair being pivoted at their outer ends at the sides of the track and inclining upward toward each other and having a movable connection between their inner ends, rock-shafts journaled below said treadles, posts pivoted to arms projecting from the sides of said rock-shafts and engaging the united ends of the treadles, weighted arms projecting from the opposite sides of the rock-shafts, upright arms formed on the rock-shafts, connections between said upright arms, and connections between the innermost upright arm of the opposite series and opposite ends of the double lever, substantially as and for the purpose specified.

12. The combination, with the gates of a railway crossing, of a lever supporting a shifting weight, an operating connection between the vibrating end of said weighted lever and the gates, an intermediate lever connected with the shifting weight and adapted to actuate the same, a double lever having one end connected with the intermediate lever, a series of pairs of treadles located on each side of the gates, the treadles of each pair being pivoted at their outer ends at the sides of the track and inclining upward toward each other and having a movable connection between their inner ends, rock-shafts journaled below said treadles, posts pivoted to arms projecting from the sides of said rock-shafts and engaging the united ends of the treadles, weighted arms projecting from the opposite sides of the rock-shafts, upright arms formed on the rock-shafts, connections between said upright arms, and connections between the innermost upright arm of the opposite series and the opposite ends of the double lever, the connections between said series of treadles and the levers actuating the shifting weight being constructed to yield to a limited extent under the strain exerted thereon, substantially as and for the purpose specified.

13. The combination, with the gates of a railway crossing, of a lever supporting a shifting weight, a stop formed on the shifting weight, an arm connected with the vibrating end of the weighted lever and constructed to engage said stop, a releasing lever adapted to disengage said arm from the stop on the shifting weight, an intermediate lever connected with the shifting weight and adapted to actuate the same, series of connected treadles located by the side of the track on opposite sides of the gates, a connection between the innermost treadle of each series, and the intermediate lever, whereby said intermediate lever is actuated successively and progressively in the same direction by both series of levers, and operating connections between the outermost of the opposite series of levers and opposite ends of the releasing lever, substantially as and for the purpose specified.

14. The combination, with the gates of a railway crossing, of a lever supporting a shifting weight, a stop formed on the shifting weight, an arm connected with the vibrating end of the weighted lever and constructed to engage said stop, a releasing lever adapted to disengage said arm from the stop on the shifting weight, an intermediate lever connected with the shifting weight and adapted to actuate the same, series of connected treadles located by the side of the track on opposite sides of the gates, a connection between the innermost treadle of each series and the intermediate lever, whereby said intermediate lever is actuated successively and progressively in the same direction by both series of levers, and operating connections between the outermost of the opposite series of levers and opposite ends of the releasing lever, the connections between said series of treadles and the intermediate lever being constructed to yield to a limited extent under the strain exerted thereon, substantially as and for the purpose specified.

15. The combination, with the gates of a railway-crossing, of a lever supporting a shifting weight, a stop formed on the shifting weight, an arm connected with the vibrating end of the weighted lever constructed to engage said stop, a releasing lever adapted to disengage said arm from the stop on the shifting weight, an intermediate lever connected with the shifting weight and adapted to actuate the same, treadles located by the track on opposite sides of the gates, connections between the oppositely located treadles and the intermediate lever, whereby said intermediate lever is actuated in the same direction by said oppositely located treadles, and operating connections between said treadles and opposite ends of the releasing lever, substantially as and for the purpose specified.

16. The combination, with the gates of a railway-crossing, of a lever supporting a shifting weight, a stop formed on the shifting weight, an arm connected with the vibrating end of the weighted lever and constructed to engage said stop, a releasing lever adapted to disengage said arm from the stop on the shifting weight, an intermediate lever connected with the shifting weight and adapted to actuate the same, treadles located by the track on opposite sides of the gates, connections between the oppositely located treadles and the intermediate lever, whereby said intermediate lever is actuated in the same direction by said oppositely located treadles, the connections between said treadles and the intermediate lever being constructed to yield to a limited extent under the strain exerted thereon, and operating connections between said oppositely located treadles and opposite ends of the releasing lever, substantially as and for the purpose specified.

17. The combination, with railway gates pivoted to posts, of a rock-shaft located between the gates, bell crank levers pivoted to the gate-posts, rods connecting the outer limbs of the bell-crank levers and arms projecting from opposite sides of said rock-shaft, and rods connecting with the inner limbs of said bell-crank levers and with the gates inside of the posts, substantially as and for the purpose specified.

18. The combination, with railway gates pivoted to posts, of a rock-shaft located between the gates, bell-crank levers pivoted to the gate-posts, rods connecting the outer limbs of the bell-crank levers and arms projecting from opposite sides of said rock-shaft, rods connected with the inner limbs of said bell-crank levers and with the gates inside of the posts, depending rods pivoted in the outer ends of the pivoted sections of the gates, and weights detachably connected with the depending rods, substantially as and for the purpose specified.

19. The combination, with a road gate pivoted to a post, of means for operating said gate, a footway gate hinged to the pivot of the road gate, a sliding post located in a groove in the gate post, a rod pivotally connected with the road gate inside of the gate post and with the sliding post, and a rod pivotally connected with said sliding post and with the footway gate outside of the gate post, substantially as and for the purpose specified.

20. The combination, with a road gate pivoted to a post, of means for operating said gate, a footway gate having its inner end forked to embrace the end of the road gate and hinged to the pivot of said road-gate, one fork of the footway gate extending inward beyond said pivot and having a weight attached thereto, a sliding post located in a groove in the gate post, a rod pivotally connected with the road gate inside of the gate post and with the sliding post, and a rod pivotally connected with said sliding post and with the footway gate outside of the gate post, substantially as and for the purpose specified.

21. The combination, with a road gate pivoted to a post, of means for operating said gate, a footway gate hinged to the pivot of the road gate, a sliding post located in a groove in the gate post, a rod pivotally connected with the road-gate inside of the gate post and with the sliding post, a rod pivotally connected with said sliding post and with the footway gate outside of the gate post, buffers attached to the face of the sliding post and adapted to engage buffers on the gate post, a bell attached to the gate post, and an arm on the sliding post adapted to sound said bell, substantially as and for the purpose specified.

HARRY W. ALBRIGHT.
SAMUEL B. LENHERT.

Witnesses:
JACOB HALBACH,
WM. R. GERHART.